US011762357B2

(12) United States Patent
Handy et al.

(10) Patent No.: US 11,762,357 B2
(45) Date of Patent: *Sep. 19, 2023

(54) METHOD AND APPARATUS FOR INITIALIZING A CONTROLLER MODULE

(71) Applicant: GE Aviation Systems Limited, Cheltenham (GB)

(72) Inventors: Peter James Handy, Cheltenham (GB); David Alan Elliott, Gloucester (GB); James Angelo Elder, Cheltenham (GB); Denis Vaughan Weale, Bristol (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,338

(22) Filed: Apr. 19, 2021

(65) Prior Publication Data
US 2021/0240153 A1 Aug. 5, 2021

Related U.S. Application Data

(63) Continuation of application No. 16/174,439, filed on Oct. 30, 2018, now Pat. No. 10,983,495.

(30) Foreign Application Priority Data

Nov. 24, 2017 (GB) ...................................... 1719554

(51) Int. Cl.
G05B 19/02 (2006.01)
G05B 19/042 (2006.01)
(Continued)

(52) U.S. Cl.
CPC ......... *G05B 19/0423* (2013.01); *G05B 15/02* (2013.01); *G05B 19/042* (2013.01);
(Continued)

(58) Field of Classification Search
CPC .. G05B 19/0423; G05B 15/02; H04L 61/2038
See application file for complete search history.

(56) References Cited

U.S. PATENT DOCUMENTS 6,664,656 B2 12/2003 Bernier
7,007,179 B2 2/2006 Mares et al.
(Continued)

FOREIGN PATENT DOCUMENTS

EP 1320222 B1 11/2012
EP 3076250 B1 3/2020
(Continued)

*Primary Examiner* — Mark A Connolly
(74) *Attorney, Agent, or Firm* — McGarry Bair PC

(57) ABSTRACT

The present disclosure relates to a control module circuit having a circuit communication input port, a circuit communication output port, a first controllable unit that has a first controller module, and a second controllable unit having a second controller module. The first controller module has a first communication input port connected with the circuit communication input port and a first communication output port. The second controller module has a second communication input port connected with the first communication output port and a second communication output port connected with the circuit communication output port. The first and second controllable units are adapted to be identified with a permanent identity by way of a transmittable data signal receivable at the communication input port and sequentially received by the first and second controllable units.

18 Claims, 6 Drawing Sheets

(51) Int. Cl.
  *G05B 15/02* (2006.01)
  *H04L 61/5038* (2022.01)
  *H04L 101/627* (2022.01)
(52) U.S. Cl.
  CPC .............. *G05B 2219/21063* (2013.01); *G05B 2219/25032* (2013.01); *G05B 2219/25257* (2013.01); *H04L 61/5038* (2022.05); *H04L 2101/627* (2022.05)

(56) References Cited

U.S. PATENT DOCUMENTS

| | | | |
|---|---|---|---|
| 7,228,363 | B1 | 6/2007 | Wehrle et al. |
| 7,721,079 | B2 | 5/2010 | Wehrle et al. |
| 7,774,511 | B2 | 8/2010 | Zatelman et al. |
| 7,884,495 | B2 | 2/2011 | Kojori |
| 9,033,215 | B1 | 5/2015 | Ashford et al. |
| 9,271,423 | B2 | 2/2016 | Krenz et al. |
| 10,983,495 | B2 * | 4/2021 | Elliott .................. G05B 19/042 |
| 2006/0071559 | A1 | 4/2006 | Hanson et al. |
| 2007/0260764 | A1 | 11/2007 | Summers et al. |
| 2008/0140899 | A1 | 6/2008 | Oh et al. |
| 2008/0155073 | A1 | 6/2008 | Swain |
| 2010/0185784 | A1 | 7/2010 | De Nie et al. |
| 2010/0280786 | A1 | 11/2010 | Gorbold et al. |
| 2011/0029137 | A1 | 2/2011 | Yasohara et al. |
| 2014/0173081 | A1 | 6/2014 | Knapp et al. |
| 2015/0095541 | A1 | 4/2015 | Chadwick, Jr. et al. |
| 2016/0205066 | A1 | 7/2016 | Attarwala et al. |
| 2017/0070564 | A1 | 3/2017 | Sinistro et al. |
| 2019/0129369 | A1 * | 5/2019 | Song ..................... H02J 7/0029 |

FOREIGN PATENT DOCUMENTS

| | | |
|---|---|---|
| EP | 3635565 A1 | 4/2020 |
| GB | 2568725 A | 5/2019 |
| TW | 200845037 A | 11/2008 |
| WO | 2008067658 A1 | 6/2008 |
| WO | 2018213270 A1 | 11/2018 |

* cited by examiner

METHOD AND APPARATUS FOR INITIALIZING A CONTROLLER MODULE

CROSS-REFERENCE TO RELATED APPLICATIONS

This application is a continuation of U.S. application Ser. No. 16/174,439 filed Oct. 30, 2018, now issued as U.S. Pat. No. 10,983,495 issues Apr. 20, 2021, which claims priority to United Kingdom Patent Application No. GB1719554.6, filed Nov. 24, 2017, both of which are incorporated herein by reference in its entirety.

BACKGROUND OF THE INVENTION

Controller modules can be included in many electrical circuits and configured to perform functional operations or tasks, such as controlling another component or executing a set of instructions. In some instances, a set of controller modules can be included, contained, or arranged in a single circuit, circuit board, node, or the like.

BRIEF DESCRIPTION OF THE INVENTION

In one aspect, the present disclosure relates to a control module circuit comprising a circuit communication input port and a circuit communication output port, and a set of controllable units arranged in a communication sequence, each controllable unit having a respective controller module including a communication input port and a communication output port wherein the communication input port of a first of the controller modules in the communication sequence is connected with the circuit communication input port, and wherein the communication output port of at least one of the controller modules of the set of controllable units is connected to the circuit communication output port.

In another aspect, the present disclosure relates to a control module circuit programming assembly comprising a circuit communication input port and a circuit communication output port, a set of controllable units arranged in a communication sequence, each controllable unit having a respective controller module including a communication input port and a communication output port, and a programming controller module configured to generate a programming data signal supplied to the circuit communication input port, wherein the programming data signal is configured to sequentially identify each of the set of controllable units with a permanent identity, wherein the communication input port of a first of the controller modules in the communication sequence is connected with the circuit communication input port, and wherein the communication output port of at least one of the controller modules of the set of controllable units is connected to the circuit communication output port.

DESCRIPTION OF EMBODIMENTS OF THE INVENTION

Figure 1:
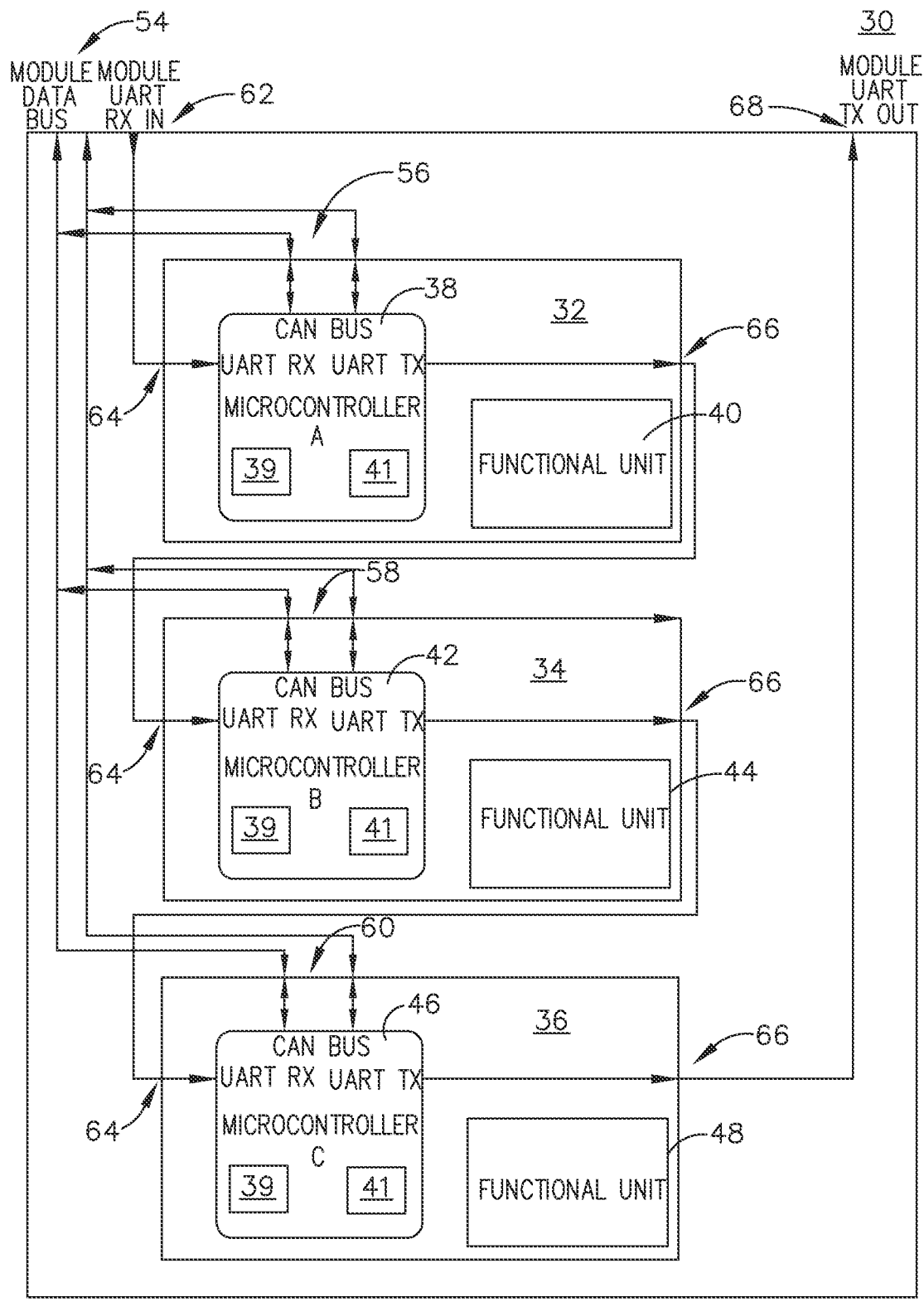
FIG. 1 is an example schematic view of a controller module circuit in accordance with various aspects described herein.

The described aspects of the present disclosure are directed to an electrical system or circuit having a set of controller modules. The controller modules can be adapted, configured, operable, or enabled for performing a technical task or producing a technical effect of execution of a set of instructions. The electrical system or circuit can be utilized in any number of applications, including but not limited to, mobile applications and non-mobile industrial, commercial, and residential applications. For example, it will be understood that aspects of the disclosure can be utilized, and has general application, to any electronic system wherein a number of smaller circuit blocks are connected by a data network, wherein the smaller circuit blocks provide a useful functionality, and can be programmed, initialized, or the like, as described herein.

Non-limiting environments that can be applicable for aspects of the disclosure can include cars, ships, domestic housing, factories, speech recognition, temperature measurement, robotic machine control or operations, or any other system or spaces that include a controller module or controllable unit that performs a specific role determined by its electrical location and which must be assigned an appropriate network address for data communications for that position or location. Furthermore, while aspects of the disclosure are described with respect to a single controller module or controllable unit, the disclosure is equally applicable to environments that have a set of controller modules to perform the specific role or function. For example, an individual controller module can have a subset of controllable units or controller modules in the quantity of zero, one, or more than one, and wherein the subset of controller modules can be utilized for programming, identification, addressing, or the like, as described herein.

While "a set of" various elements will be described, it will be understood that "a set" can include any number of the respective elements, including only one element. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. In non-limiting examples, connections or disconnections can be selectively configured to provide, enable, disable, or the like, an electrical connection or communicative connection between respective elements.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

The exemplary drawings are for purposes of illustration only and the dimensions, positions, order and relative sizes reflected in the drawings attached hereto can vary.

FIG. 1 illustrates one non-limiting example of a control module circuit 30 in accordance with an exemplary illustration of the disclosure. The control module circuit 30 can include a substrate, such as a printed circuit board, and a set of controllable units, shown as a first controllable unit 32, a second controllable unit 34, and a third controllable unit 36. The first controllable unit 32 can include a respective first controller module 38 having a processor 39 and memory 41, and an optional first functional unit 40 communicatively connected with the first controller module 38. Similar to the first controllable unit 32, the second controllable unit 34 can include a second controller module 42 (for example, substantially similar to the first controller module 38) communicatively connected with an optional second functional unit 44, and the third controllable unit 36 can include a third controller module 46 (for example, substantially similar to the first controller module 38) communicatively connected with an optional third functional unit 48.

As used herein, a "functional unit" 40, 44, 48 can include any unit component, module, or the like, that can operably perform some functional task in response to communication with the respective controller module 38, 42, 46. Examples of functions or functional tasks performed by the functional units 40, 44, 48 can include, but not limited to, controlling or actuating another component or system, operating a physical or virtual task, or regulating or operating other mechanical or electrical devices. It should be recognized that controller modules 38, 42, 46 do not necessarily require the optional function unit 40, 44, 48. Rather, in some circumstances controller modules 38, 42, 46 can sense, calculate, measure, or perform other functions and provide results to another system, controller module, or functional unit.

Non-limiting aspects of the control module circuit 30 can be included wherein, for example, each respective controllable unit 32, 34, 36 or controller module 38, 42, 46 is communicatively connected with a common communication bus input 54. For example, the first controllable unit 32 can include a first communication connection 56, the second controllable unit 34 can include a second communication connection 58, and the third controllable unit 36 can include a third communication connection 60, wherein each communication connection is connected with the common communication bus input 54 of the control module circuit 30. In one non-limiting aspect of the disclosure, the common communication bus can include a Controller Area Network (CAN) bus or RS-485, but additional communication buses or communication connections are envisioned.

In one non-limiting aspect of the disclosure, the control module circuit 30 can receive control instructions communicated from a controller module (not shown) for the operation of the control module circuit 30. For instance, control instructions received at the common communication bus input 54 can include broadcast-type instructions that are equally received by each respective communication connection 56, 58, 60 of the respective controllable unit 32, 34, 36 or controller module 38, 42, 46, and wherein the broadcast can include an addressing scheme such that only intended controllable units 32, 34, 36 operate, respond, or execute the desired instruction. Non-limiting aspects of the disclosure can include unidirectional or bidirectional communications in any of the aforementioned or further described communication buses, ports, connectors, or the like. Further non-limiting aspects of the disclosure can be included wherein the set of controllable units 32, 34, 36 are substantially alike in design or performance, or dissimilar, as desired.

Non-limiting aspects of the control module circuit 30 can further include a specialized data input port 62 and a specialized data output port 68. As used herein, "specialized" data can include ports adapted or configured to receive supplementary data, non-operational data (e.g. data distinguished from the common communication bus input 54), or a combination thereof for functionality or operations of the control module circuit 30. For instance, specialized data can include, but is not limited to, programming data, identification data, initialization data, power-on or "boot-up" data, or the like. In one non-limiting example, the specialized data ports 62, 68 can be configured, adapted, or arranged to operate in accordance with a serial bus or universal asynchronous receiver/transmitter (UART) port or protocol. Additional or alternative port types or protocols are envisioned.

Further non-limiting aspects of the disclosure can be included wherein each respective controllable unit 32, 34, 36 can include a respective controllable unit specialized data input port 64 and a controllable unit specialized data output port 66. In another non-limiting aspect of the disclosure, the respective controllable units 32, 34, 36 can be arranged, connected, or the like, in a series or linear type arrangement by way of the respective specialized data ports 62, 64, 66, 68. For example, the controllable unit specialized data input port 64 of the first controllable unit 32 can be connected with the specialized data input port 62 of the control module circuit 30. The controllable unit specialized data output port 66 of the first controllable unit 32 can further be connected with the controllable unit specialized data input port 64 of the second controllable unit 34. The controllable unit specialized data output port 66 of the second controllable unit 34 can further be connected with the controllable unit specialized data input port 64 of the next sequential controllable unit. The final, or last sequential controllable unit specialized data output port 66 can be further connected with the specialized data output port 68 of the control module circuit 30. In this sense, the set of controllable units 32, 34, 36 can be linked in a continuous "daisy chain" or arranged in a linear or sequential "daisy chain" arrangement, via the specialized data ports 62, 64, 66, 68.

While three controllable units 32, 34, 36 are illustrated, non-limiting aspects of the control module circuit 30 can include any number of switchable elements.

Figure 2:
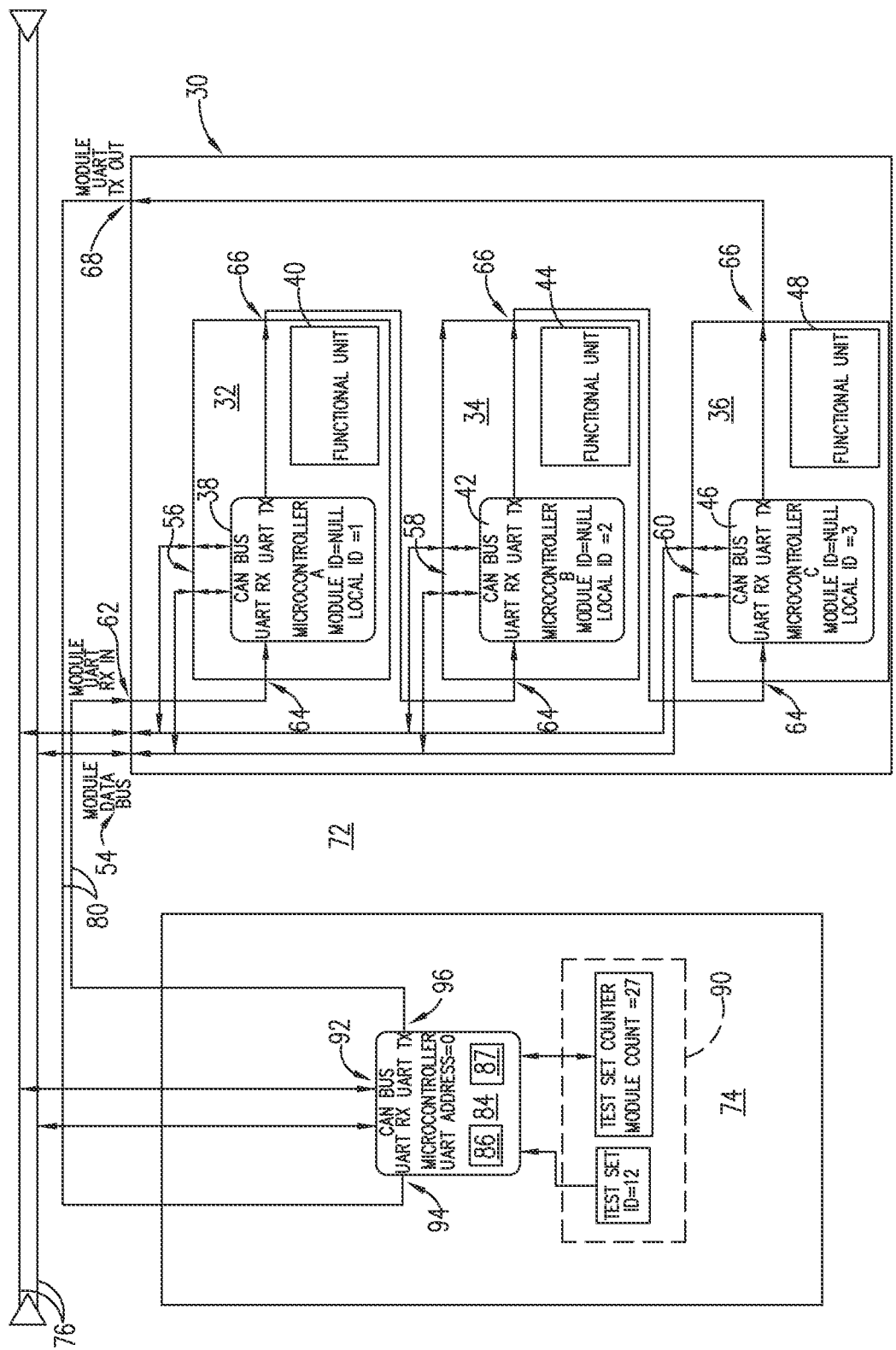
FIG. 2 is an example schematic view of a programming circuit for the controller module circuit of FIG. 1, in accordance with various aspects described herein.

Turning now to FIG. 2, an example test or programming circuit 72 for programming operations of the control module circuit 30 is shown. In one non-limiting aspect, the programming circuit 72 can be applied, or the programming operations of the control module circuit 30 can occur during manufacturing, or prior to installation of the control module circuit 30 in the expected operating environment. As illustrated, the programming circuit 72 can include a programming module 74, further comprising a test or programming controller module 84 having a processor 86 and memory 87.

The programming controller module 84 can further include a programming communication connection 92 connected with a communication bus 76 (such as a CAN bus), and a programming module specialized data input port 94 and a programming module specialized data output port 96. The programming module specialized data ports 94, 96 can be further connected with a specialized data bus 80. As shown, the control module circuit 30 can further be connected with the communication bus 76 by way of the common communication bus input 54 and connected with the specialized data bus 80 by way of the specialized data input port 62 (for instance, connected with the programming module specialized data output port 96) and the specialized data output port 68 (for instance, connected with the programming module specialized data input port 94).

The programming module 74 can further include a set of test or programming data 90, for example stored in memory 87 of the programming controller module 84. Illustrated schematically, the set of programming data 90 can include, but is not limited to, a Test Set ID value, a Module Count value, or a combination thereof.

Non-limiting aspects of the disclosure can be included wherein, for example, the set of controller modules 38, 42, 46 are capable of being enabled to receive new code or data by way of at least the controllable unit specialized data input port 64, and store the code or data in memory, such as the controller module memory 41. Aspects of the disclosure can be included wherein the new code or data can include unique addressing information or data, such as the relative or physical location of the respective controllable unit 32, 34, 36 in the control module circuit 30. Additionally, aspects of the disclosure can be included wherein the unique addressing information or data is programmed, "burned-in", or the like, for each respective controllable unit 32, 34, 36. In this sense, each controllable unit 32, 34, 36 can receive a permanent identification relative to the control module circuit 30, by way of the programming circuit 72 or programming module 74 operations.

During programming operations, the set of controller modules 38, 42, 46 will be ready to receive the specialized data generated at the specialized data output port 96 of the programming module, and provided to the specialized data input port 62 of the control module circuit 30, via the specialized data bus 80. The first controllable unit 32 or first controller module 38 will then receive the specialized data at the controllable unit specialized data input port, from the controller data input port of the control module circuit 30. The specialized data can include, but is not limited to, identifying data, such as a number, sequence of data, or the like. For example purposes, the first controller module 38 can receive specialized data indicating or identifying the number '0'.

In accordance with the programming operations, the first controller module 38 can be configured to operably increment the identifying number '0' to '1', which the first controller module 38 can then permanently store in memory as identifying data, such as a "local ID" value. The first controller module 38 can then be configured to transmit the identifying number '1' to the next controllable unit 34 arranged in series by the linear arrangement of the specialized data ports 64, 66. In the illustrated example, the specialized data, including identifying number '1' is transmitted from the specialized data output port 66 of the first controllable unit 32 to the specialized data input port 64 of the second controllable unit 34 or second controller module 42. Similar to the programming operations of the first controller module 38, the second controller module 42 can be configured to operably increment the identifying number '1' to '2', which the second controller module 42 can then permanently store in memory as identifying data, such as a "local ID" value. The second controller module 42 can then be configured to transmit the identifying number '2' to the next controllable unit 36 arranged in series by the linear arrangement of the specialized data ports 64, 66, so on and so on, until each in the set of controllable units 32, 34, 36 have received and have been programmed with unique identifying data. At the end of the series of controllable units 32, 34, 36, the final controllable unit specialized data output port 66 can transmit the identifying number back to the programming module specialized data input port 94 of the programming module 74, via the control module circuit's specialized data output port 68 and the specialized data bus 80.

Non-limiting aspects of the disclosure can be included wherein, for example, the programming module 74 or the programming controller module 84 validates or verifies that the returned identifying number, specialized data, or the like, is in accordance with the expected programming or identifying of the control module circuit 30. Additionally, or alternatively, non-limiting aspects of the disclosure can be included wherein the programming circuit 72, programming module 74, or the like can further provide programming or further configuration of the set of controllable units 32, 34, 36, for example, by way of the communication bus 76 or common communication bus input 54, once the set of controllable units 32, 34, 36 have been programmed with the identifying data or specialized data. In this sense, the set of controllable units 32, 34, 36 are identifiable or addressable by way of further communication connections, due to the identifying data or specialized data. In another non-limiting aspect of the disclosure, aspects of the programming circuit 72, the programming module 74, or the programming controller module 84 can be included wherein, for example, the programming circuit 72 can be configured to sense a failure of "timing out" of the specialized data transmissions, to determine if the control module circuit 30 (or a controllable unit thereon) is defective. In yet another non-limiting aspect of the disclosure, the above-described process can be applied to a repaired control module circuit 30 and overwrite any stored identifying data or specialized data in a subsequent programming.

Non-limiting aspects of the disclosure can include additional information or data included in the identifying data or specialized data. For instance, in one non-limiting example, the identifying data or specialized data can further be encoded or include at least a subset of information from the programming data 90 (e.g. Test Set ID, Module count, or the like). In this sense, the set of controllable units 32, 34, 36 can be further identified, not only relative to each other within the control module circuit 30, but with a unique set of identifying data or specialization data that is unique to each controllable unit manufactured (e.g. unique in the world). Any number of addressing schemes can be included to provide each controllable unit a unique identifier, specialized data, or the like.

Figure 3:
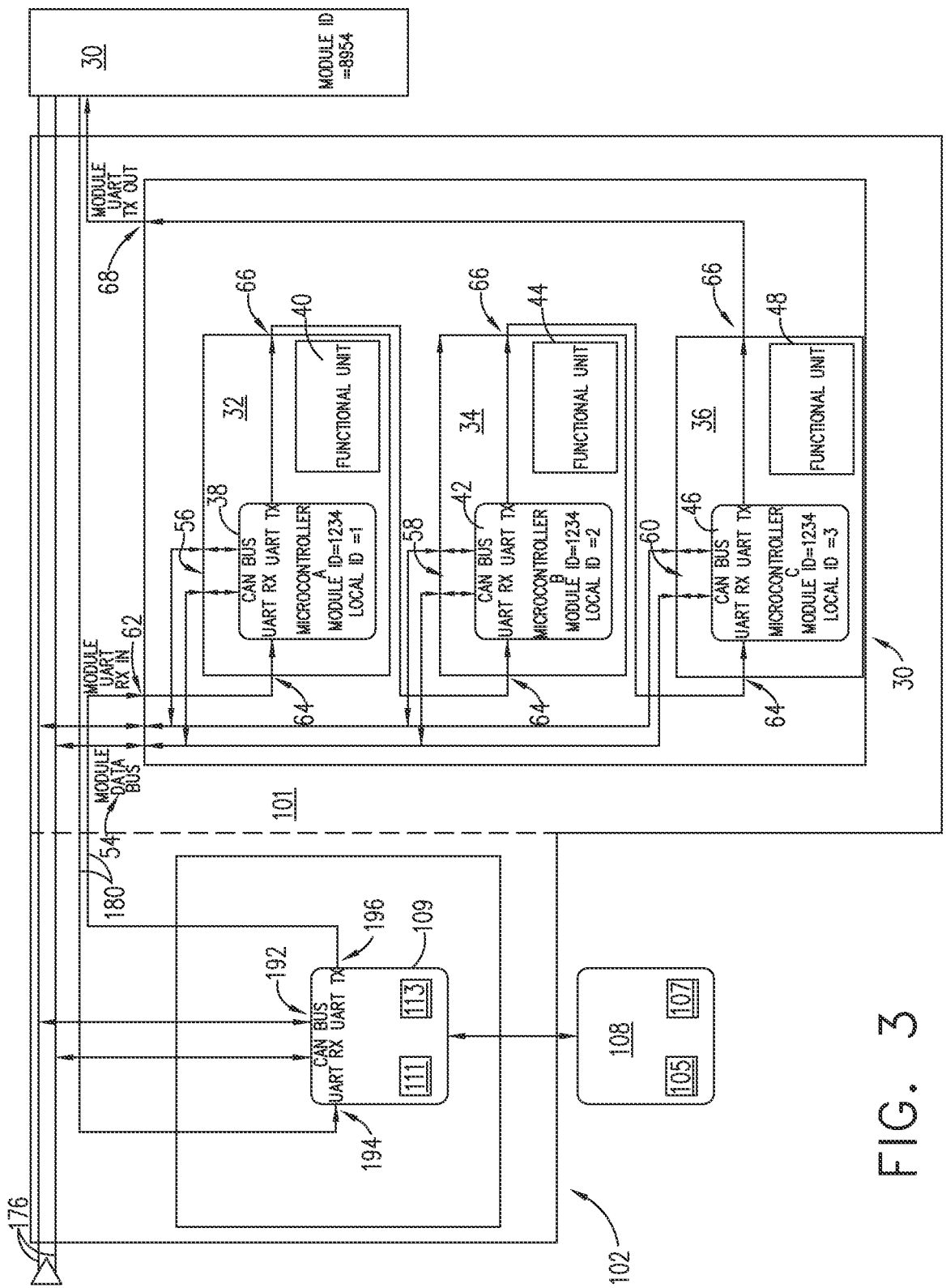
FIG. 3 is an example schematic of an operational system including the controller module circuit of FIG. 1, in accordance with various aspects described herein.

FIG. 3 illustrates a schematic example view of a set of control module circuits 30 in an "in situ" arrangement that is installed in a multiple controller system 101. The multiple controller system 101 can include similar inputs, outputs, busses and the like, as previously described, thus, like parts will be identified with like numerals increased by 100, with it being understood that the description of the like parts or numbers applies to a multiple controller system 101, unless otherwise noted.

As shown, the multiple controller system 101 can include a system controller 102, including a system controller module 109. The system controller module 109 can include a processor 111 and memory 113, a communication connection 192, a programming module specialized data input port 194, and a specialized data output port 196. The programming module specialized data ports 194, 196 can be connected with a specialized data bus 180 and the communication connection 192 can be connected with a communication bus 176. In a non-limiting aspect, the system controller 102 can be further connected with, or controllable in response to communications from an external controller module 108, having a processor 105 and memory 107. In one non-limiting example, the external controller module 108 can control overall aspects of the multiple controller system 101 while the system controller 102 controls aspects of a subset of the control module circuits 30.

Each control module circuit 30 of the multiple controller system 101 can be connected, respectively, with the communication bus 176 via the common communication bus input 54 and with the specialized data bus 180 via the specialized data input and output ports 62, 68. Non-limiting aspects of the multiple controller system 101 can assume the set of controllable units 32, 34, 36 have been previously programmed with an addressable location, identifying information or data, or at least a subset of specialized data, as described with respect to FIG. 2.

Aspects of FIG. 3 can be utilized for referencing, further programming, further identifying, or the like, the set of control module circuits 30, set of controllable units 32, 34, 36, or the like, in the multiple controller system 101. Aspects described herein can be used to validate or verify the set of controllable units 32, 34, 36 or control module circuits 30, as well as identify or provide addressing of the like. In one non-limiting example, the validating, verifying, identifying, addressing, or the like can occur during a start-up process, boot-up process, initialization process, initialization process, or the like, or after maintenance operations, such as when a controllable unit or control module circuit is replaced or fixed.

In one non-limiting aspect, during a respective start-up process, boot-up process, initialization process, initialization process, or the like, each controllable unit 32, 34, 36 can be configured to await a specialized data message at its respective controllable unit specialized data input port 64. The system controller 102 or system controller module 109 can then generate and transmit a specialized data message at the system controller specialized data output port 196 to be delivered to the first controllable unit 32 in the daisy-chained sequence, via the specialized data bus 180 and specialized data input port 62, as explained herein. In one non-limiting aspect, the specialized data message can include a first discovery message. The discovery message can, for example, operably cause the respective control module circuit 30 to send or transmit a control module circuit identifier or identifying value (e.g. a "module ID" is shown) onto the communication bus 176, which can then be recorded by the system controller 102. It is understood that non-limiting aspects of the disclosure can be included wherein, at this point in the sequence of events, the controllable units 32, 34, 36 have not necessarily been assigned individual labels, addresses, unique identifiers, or the like (for addressing purposes), which can be required for operational or functional message transmissions via the communication bus 176. For instance, this initial or discovery message can be sent or transmitted using a common preassigned address or label that is "universal" to all of the controllable units 32, 34, 36, control module circuits 30, controller modules, or a combination thereof. This usage of universal address or label may not conform to some of the "normal" communication bus 176 data protocols, and can be confined to this initial discovery phase. Additional non-limiting aspects of the discovery message can be included.

The first discovery message can proceed through the daisy-chaining of the set of controllable units 32, 34, 36, until the last in the sequence outputs the first discovery message to the specialized data output port 68 of the control module circuit 30 to the specialized data input port 62 of the next sequential control module circuit 30. The next sequential control module circuit 30 then broadcasts its own control module circuit identifier or identifying value onto the communication bus 176, which is then recorded by the system controller 102. The sequence continues until the last control module circuit 30 in the multiple controller system 101 returns the specialized data or first discovery message back to the system controller programming module specialized data input port 194.

Aspects of the disclosure can be included wherein, the sequencing of the broadcasts by each respective control module circuit 30 is controllably such that, or to ensure that, the broadcasts of the control module circuits 30 do not overlap on the communication bus 176.

At this time, the system controller 102 now has a log, list, table, or data for the set of the connected control module circuits 30. In non-limiting examples, the system controller 102 can determine an order of the connected set of control module circuits 30, and can assign one or more additional addressable identifiers to each respective control module circuit 30. As used here, "additional addressable identifiers" means addressable identifiers beyond or not including the earlier-described identifying data included as part of the specialized data. The system controller 102 or the system controller module 109 can then generate or transmit a second specialized data message, including at least a set or series of data bus allocation messages by way of the communication bus 176 of the specialized data bus 180. The second specialized data message can include the one or more additional identifying values for the control module circuit 30 based on the order of the control module circuit 30 in the sequence or series of control module circuits 30. For instance, the first control module circuit 30 that receives the earlier-described discovery message will be the first to broadcast the control module circuit identifier or identifying value onto the communication bus 176, and thus, the first broadcast received and recorded by the system controller 102 will be the "closest" control module circuit. The second broadcasting control module circuit 30 will be the next-closest control module circuit 30, and so on.

The second specialized data message can thus assign another identifying value based on the respective sequence of the control module circuits 30, for example, identifying the closest control module circuit 30 as '10', the second closest control module circuit as '20', and so on. In this manner, the system controller 102 can further assign identifying values, for example, used in the addressing of commanding or controlling instructions, at the time of start-up or initialization. In one non-limiting aspect, commanding or controlling instructions to operate respective controllable units 32, 34, 36 can be addressable by way of the control module circuit identifying value (e.g. "10") and the controllable unit identifying value (e.g. "2"; the second controllable unit 34 of the first control module circuit 30 in the sequence). For example, further assignment of one or more labels or addresses can be organized, applied, tabulated, or otherwise assigned and recorded for the respective set of control module circuits 30. The assignments can further be communicated to, for example, the external controller module 108.

It will be understood that non-limiting aspects of the disclosure can include methods, processes, data structures, and the like, (e.g. other than timing of the response order) for determining the physical sequence could be preferred and optionally can be used, alone, or in combination, to provide a cross-checking, validation, verification, or the like, functionality. For instance, in one non-limiting example, the first discovery message could include a counter data field, initialized to communicate an identifier (e.g. "zero") by the system controller module 109, and incremented by one as it passes through each respective controller module 38, 42, 46, controllable unit 32, 34, 36, or the like. Thus, by including a copy of the local value of this field received by the respective controller module 38, 42, 46, controllable unit 32, 34, 36, or the like, in each respective broadcast message recorded by the system controller module 109, the system controller module 109 can determine the physical location in the chain of each controller. This method has the advantage of guaranteed immunity of the order of messages being received by the system controller, possibly due to an automatic resend functionality, transmission priority protocols, transmission errors, or the like.

In another non-limiting example, the respective start-up process, boot-up process, initialization process, or the like can include a fault-recovery process. For example, during the initialization process described herein, if one of the control module circuits 30 in the sequence of control module circuits 30 did not respond, timed out, or otherwise did not reply to the discovery message as intended, expected, desired, or the like, the subsequent control module circuits 30 in the sequence can still report their respective presence in a broadcast message, as described. In one non-limiting example, a control module circuit 30 can fail to respond due to a fault, error, or another otherwise unexpected operation. In this example, the system controller module 109 can still operably log or receive the broadcast messages by the operational or non-functional controller module 38, 42, 46, controllable unit 32, 34, 36, or the like.

In another non-limiting example, the respective start-up process, boot-up process, initialization process, or the like can operably pass over or "skip" a control module circuit 30 that has failed to otherwise respond. For example, a set of control module circuits 30 can be configured to operably listen for the broadcast responses from other control module circuits 30 while they await their specialized data to be received. In the event that a control module circuit 30 fails to broadcast a response (e.g. the control module circuit 30 has failed in some way), a downstream control module circuit 30 (relative to the sequence or chain) can monitor the communication bus 176 (for other broadcast responses from control module circuits 30), and upon satisfying a time-out value (while also not receiving the discovery message), broadcast its own broadcast message including a time-out indicator. The out-of-sequence broadcast message including the time-out indicator can be received, recorded, or the like, by the system controller module 109, which can further negotiate a "restart" message over the communication bus 176 to restart, redistribute, or otherwise initiate another discovery message which the downstream control module circuits 30 can respond to, and is passed through each respective controller module 38, 42, 46, controllable unit 32, 34, 36, or the like, as described herein. The system controller module 109 can log or record the timed-out or not responding control module circuit 30 with an error indicator, or the like, and operably disable the operation of the non-responsive control module circuit 30. Non-limiting aspects of this example can be included wherein the set of control module circuits 30 can vary their broadcast time-out values (e.g. by randomization, sequentially organized value, etc.) to ensure that no message collisions occur on the communication bus 176 when downstream control module circuits 30 restart the discovery message. Another non-limiting aspect of this example can be included wherein the set of control module circuits 30 can vary their broadcast time-out values to minimize a probability of collision, for example, in combination with collision detection and retry or resending the discovery message operations, as described.

In a non-limiting example, the described operation would allow or enable the multiple controller system 101 to generally operate without the faulted control module circuit 30, and would minimize the number of non-operational control module circuits 30, controllable units 32, 34, 36, or the like, without disrupting the entire multiple controller system 101.

Figure 4:
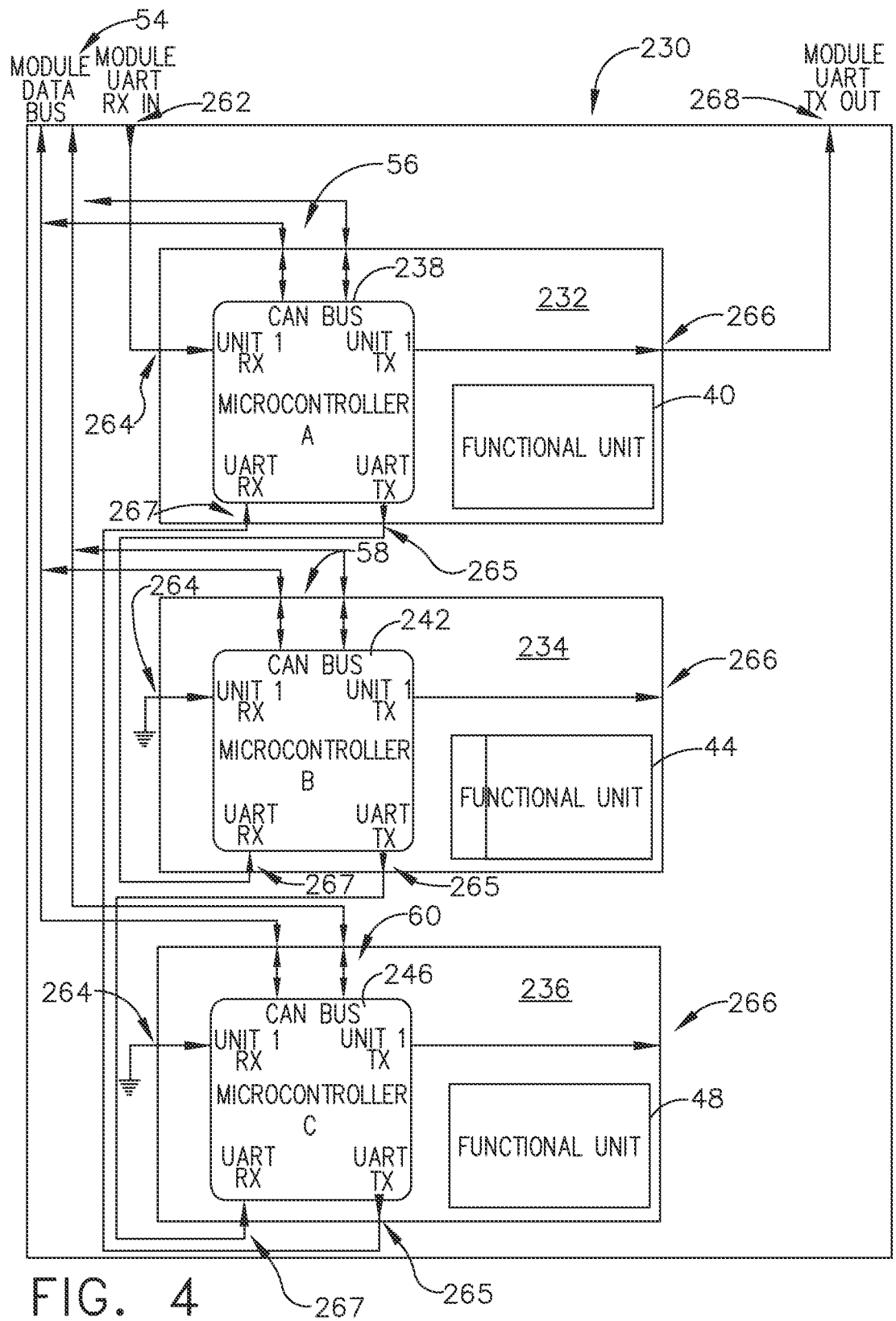
FIG. 4 is an example schematic view of another controller module circuit, in accordance with various aspects described herein.

FIG. 4 illustrates another control module circuit 230 according to another aspect of the present disclosure. The control module circuit 230 is similar to the control module circuit 30; therefore, like parts will be identified with like numerals increased by 200, with it being understood that the description of the like parts of the control module circuit 30 applies to the control module circuit 230, unless otherwise noted. One difference is that the set of controllable units 232, 234, 236 can include multiple specialized data input and output ports. For instance, each respective controllable unit 232, 234, 236 can include a first specialized data input port 264 and a second specialized data input port 267, and a first specialized data output port 266 and a second specialized data output port 265.

As shown, the first controllable unit 232 in the sequence can have the first specialized data input port 264 connected with the specialized data input port 262 of the control module circuit 230, and configured to receive the aforementioned specialized data messages or signals. The first controllable unit 232 in the sequence can further have the first specialized data output port 266 connected with the specialized data output port 268 of the control module circuit 230, and configured to transmit or carry forward the aforementioned specialized data messages or signals to the next control module circuit or back to the originating control module circuit or module. The first controllable unit 232 in the sequence can also have the second specialized data output port 265 connected with the second specialized data input port 267 of the next sequential controllable unit 234, and configured to transmit or carry forward the aforementioned specialized data messages or signals to the next sequential controllable unit 234. The second specialized data output port 265 of the final controllable unit 236 in the sequence can be connected with the second specialized data input port 267 of the first sequential controllable unit 232. In this sense, at least a portion of the specialized data can be received at the first sequential controllable unit 232, and carried forward to the next control module circuit or module, while at least a portion of the specialized data can be daisy-chained or sequentially transmitted within the control module circuit 30 simultaneously.

Figure 5:
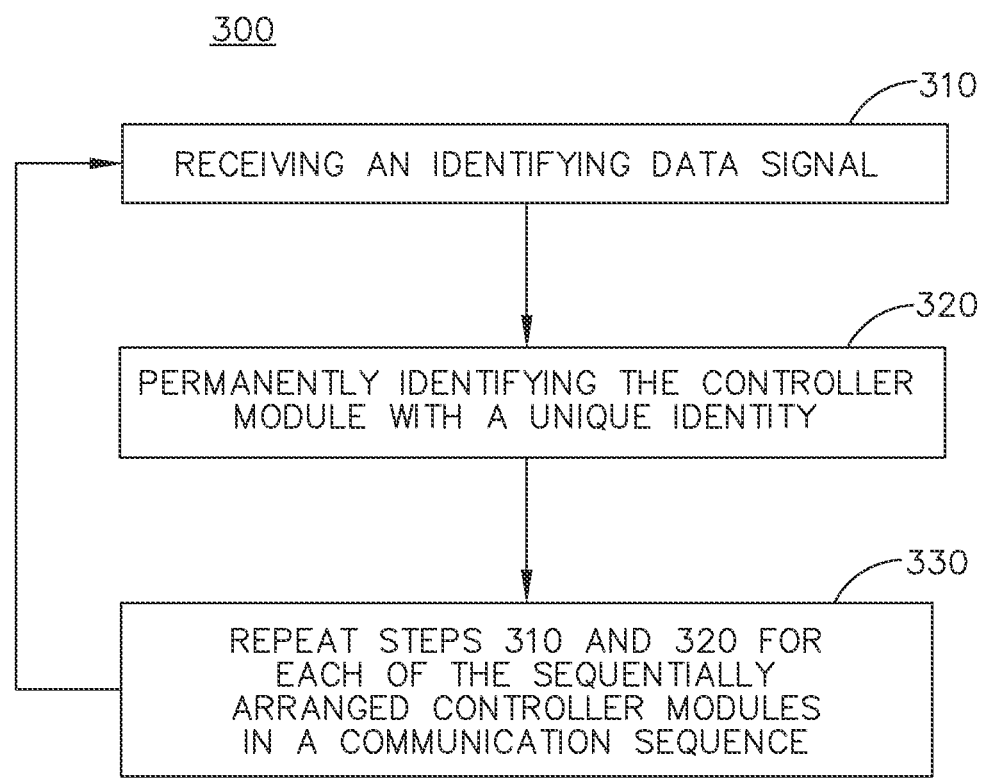
FIG. 5 is an example a flow chart diagram demonstrating a method of associating a permanent identity with a set of controller modules, in accordance with various aspects described herein.

FIG. 5 illustrates a flow chart demonstrating a method 300 of associating a permanent identity with a set of controller modules, as described with respect to FIG. 2. The method 300 begins by receiving an identifying data signal, including but not limited to the specialization data to a communications input of a control module circuit 30, 230 having the set of controller modules 38, 42, 46, 238, 242, 246 arranged in a communication sequence, at 310. In one non-limiting example, the communication sequence can be arranged by way of the programming module specialized data input and output ports 94, 96, and controllable unit specialized data input and output ports 264, 265, 266, 267. The method 300 can further include supplying the identifying data signal to one of the set of controller modules 38, 42, 46, 238, 242, 246. Next, the method 300 permanently identifies the one of the set of controller modules 38, 42, 46, 238, 242, 246 with a unique identity at 320. The method 300 can then repeat at least the receiving step at 310 and the permanently identifying step at 320 for each successive and sequential controllable unit, functional unit, or controller module in the communications sequence, at 330.

Additional non-limiting aspects of the method 300 can include, for example, further incrementing or iterating the identifying data signal prior to permanently identifying the next of the set of controller modules 38, 42, 46, 238, 242, 246. In yet another example, the identifying data signal can be used for generating the unique identity. In yet another non-limiting aspect, after completing the repeating of step 330, further programming the set of controller modules 38, 42, 46, 238, 242, 246 by way of a common communication bus, such as the communication bus 76, by addressing the set of controller modules 38, 42, 46, 238, 242, 246 by their respective unique identity.

Figure 6:
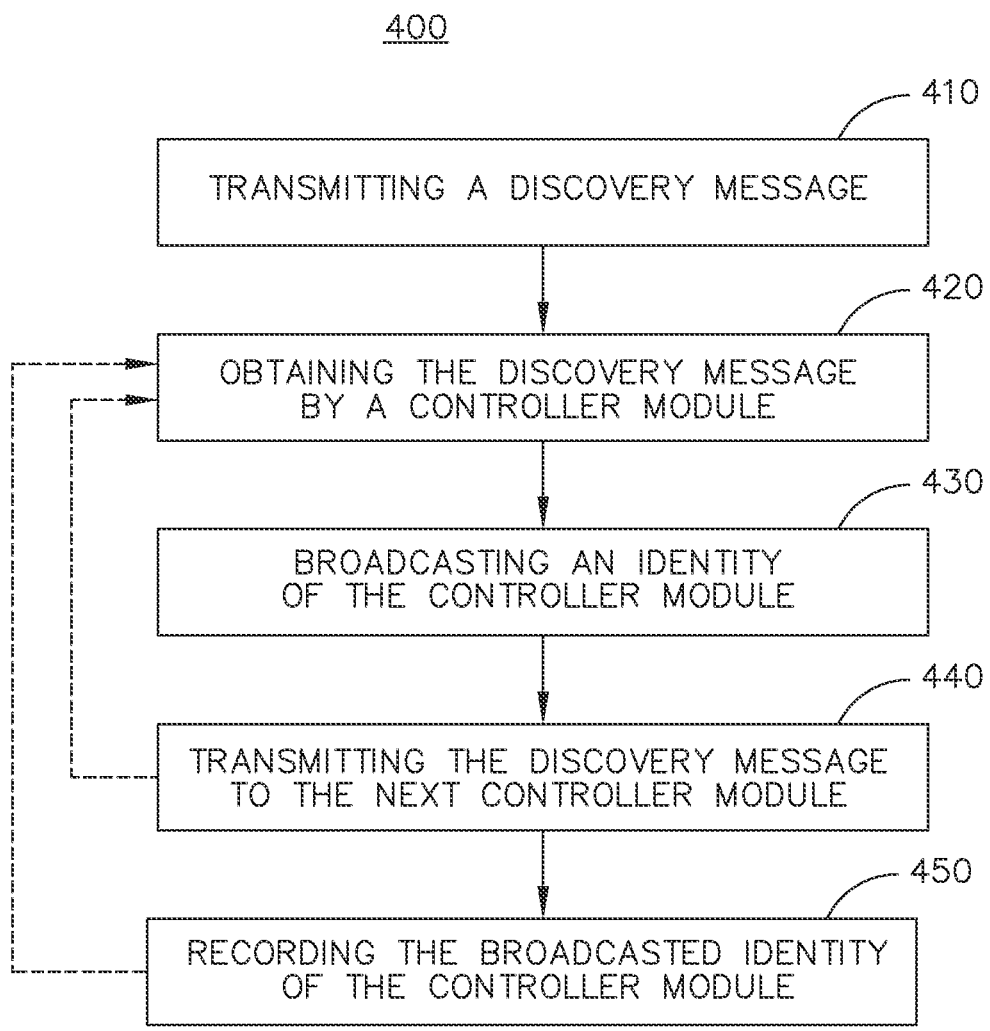
FIG. 6 is an example a flow chart diagram demonstrating a method of initializing a set of controller modules in a circuit, in accordance with various aspects described herein.

FIG. 6 illustrates a flow chart demonstrating a method 400 of initializing a set of controller modules in a multiple controller system, as described with respect to FIG. 3. The method 400 begins by transmitting, by a system controller module 109 a discovery message on a non-addressable and sequentially arranged data pathway, to the set of controller modules 38, 42, 46, 238, 242, 246, at 410. In one non-limiting example, the non-addressable and sequentially arranged data pathway can be arranged by way of the system controller specialized data input and output ports 194, 196 and controllable unit specialized data input and output ports 264, 265, 266, 267. Next, the method 400 includes obtaining, by a first controllable unit (for example, the first controllable unit 32, 232 or the first controller module 38, 238) in the data pathway sequence, the discovery message, at 420.

The method 400 can then broadcast on an addressable data bus, such as the communication bus 176, by the controller module 38, 42, 46, 238, 242, 246, an identity of the controllable unit, at 430. The method 400 can further include transmitting, by the first controllable unit (for example, the first controller module 38, 238), the discovery message to the next controllable unit in the data pathway sequence (for example, the second controllable unit 34, 234 or the second controller module 42, 242), at 440. In one non-limiting example, the discovery message can be modified in a predefined manner (e.g. incrementing a counter), as explained above. During the broadcasting, the method 400 can include recording, by the system controller module 102, the broadcasted identity of the controllable unit, at 450. The method can then repeat the obtaining at 420, the broadcasting at 430, the transmitting at 440, or the recording at 450 until the sequentially arranged data pathway has been completed.

The sequences depicted is for illustrative purposes only and is not meant to limit the methods 300, 400 in any way as it is understood that the portions of the method can proceed in a different logical order, additional or intervening portions can be included, or described portions of the method can be divided into multiple portions, or described portions of the method can be omitted without detracting from the described method.

Many other possible aspects, configurations, or the like, in addition to that shown in the above figures are contemplated by the present disclosure. Additionally, the design and placement of the various components can be rearranged such that a number of different in-line configurations could be realized. For instance, the control module circuit 30 of FIG. 1 or the control module circuit 230 of FIG. 4 can be equally applicable to the disclosure and methods described herein.

The aspects disclosed herein provide an apparatus and method for programming, identifying, initializing, or the like, a control module circuit having a set of functional units. The technical effect is that the above described aspects enable the programming, identifying, initializing, or the like, a control module circuit having a set of functional units. One advantage that can be realized in the above aspects is that the above described aspects provide for programming or identification of a number of control module circuits or functional units with an identity, which can be further utilized for addressable instructions on a broadcast-type communication bus. The described control module circuits can be sequentially programmed or identified by the sequential communication pathway without having to establish, individually, or independently programming identifying information by way of manual procedures. In large control module circuits, tens or hundreds of controllable units can be included on each control module circuit, saving time and effort from an otherwise manual activity with minimal manual intervention.

Yet another advantage of the disclosure is that at least a portion of identifying information for at least one of the control module circuit or the controllable units can be determined during an boot-up, initialization, or re-initialization period, wherein the system can scan and identify the components thereof. In this sense, when components have been repaired, replaced, reconfigured, or the like, the system can operably re-identify and reconfigure the associations or control schema appropriately. Again, the reconfigure can occur with minimal manual intervention, saving time and effort.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control module circuit comprising:
    a circuit communication input port and a circuit communication output port; and
    a set of controllable units arranged in a communication sequence, each controllable unit having a respective controller module including a communication input port and a communication output port, and the set of controllable units linked in a continuous daisy chain through at least some of the communication input ports and the communication output ports;
    wherein the communication input port of a first of the controller modules in the communication sequence is connected with the circuit communication input port; and wherein the communication output port of the first of the controller modules of the set of controllable units of the communication sequence is connected to the circuit communication output port.

2. The control module circuit of claim 1, wherein the set of controllable units are adapted to be identified with a permanent identity by way of a transmittable data signal receivable at the circuit communication input port and sequentially received by the controllable units in the communication sequence.

3. The control module circuit of claim 2, wherein a set of identifying information including the permanent identity of the set of controllable units can be transmitted through the circuit communication output port.

4. The control module circuit of claim 2, wherein set of controllable units are addressable via instruction signal by way of the permanent identity.

5. The control module circuit of claim 2, wherein the transmittable data signal includes a unique identifying value related to the permanent identity.

6. The control module circuit of claim 5, wherein the unique identifying value is incremented by a total number of controllable units in the communication sequence prior to subsequent transmittal of the data signal.

7. The control module circuit of claim 2, wherein the permanent identity is unique to the control module circuit.

8. The control module circuit of claim 1, wherein the communication output port of a last controllable unit of the communication sequence is connected with the circuit communication output port.

9. The control module circuit of claim 8, wherein each controllable unit of the set of controllable units includes a permanent identity that is transmitted through the communication output port of the last controllable unit of the communication sequence.

10. The control module circuit of claim 1, wherein the set of controllable units are sequentially arranged by connecting a respective communication output port of a controllable unit to a respective communication input port of an adjacent controllable unit.

11. The control module circuit of claim 1, wherein at least one of the controllable units includes a functional unit configured to operate a functional task in response to communication from the respective controllable units of the set of controllable units.

12. The control module circuit of claim 1, further comprising a communication data bus connected with the set of controllable units, and adapted to receive a circuit instruction signal.

13. The control module circuit of claim 12, wherein each controllable unit includes a communication connection connected with the communication data bus.

14. A control module circuit programming assembly comprising:
    a circuit communication input port and a circuit communication output port;
    a set of controllable units arranged in a communication sequence, each controllable unit having a respective controller module including a communication input port and a communication output port, and wherein the set of controllable units linked in a continuous daisy chain through at least some of the communication input ports and the communication output ports; and
    a programming controller module configured to generate a programming data signal supplied to the circuit communication input port, wherein the programming data signal is configured to sequentially identify each of the set of controllable units with a permanent identity;
    wherein the communication input port of a first of the controller modules in the communication sequence is connected with the circuit communication input port; and wherein the communication output port of the first of the controller modules of the set of controllable units in the communication sequence is connected to the circuit communication output port.

15. The control module circuit programming assembly of claim 14, wherein the programming data signal includes a unique identifying value related to the permanent identity.

16. The control module circuit programming assembly of claim 15, wherein the unique identifying value is iterated prior to identifying the sequentially next of the set of controllable units with a permanent identity.

17. The control module circuit programming assembly of claim 14 wherein the permanent identity is unique to the set of controllable units.

18. The control module circuit programming assembly of claim 14, further comprising a communication data bus connected with a communication connection of each of the controllable units, and is adapted to receive a circuit instruction signal.

* * * * *